(12) United States Patent
Dong (10) Patent No.: US 10,142,830 B2
(45) Date of Patent: Nov. 27, 2018

(54) COMMUNICATION SYSTEM

(71) Applicant: NEC Corporation, Tokyo (JP)

(72) Inventor: Olivier Dong, Draveil (FR)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/123,633

(22) PCT Filed: Mar. 2, 2015

(86) PCT No.: PCT/JP2015/056761
§ 371 (c)(1),
(2) Date: Sep. 2, 2016

(87) PCT Pub. No.: WO2015/133640
PCT Pub. Date: Sep. 11, 2015

(65) Prior Publication Data
US 2017/0078869 A1 Mar. 16, 2017

(30) Foreign Application Priority Data
Mar. 5, 2014 (GB) .................................. 1403908.5

(51) Int. Cl.
*H04W 8/18* (2009.01)
*H04W 4/70* (2018.01)
(Continued)

(52) U.S. Cl.
CPC ............. *H04W 8/183* (2013.01); *H04L 67/34* (2013.01); *H04W 4/70* (2018.02); *H04W 8/205* (2013.01);
(Continued)

(58) Field of Classification Search
None
See application file for complete search history.

(56) References Cited

U.S. PATENT DOCUMENTS 9,760,726 B2 * 9/2017 Berard ................. H04W 4/001
2007/0167182 A1 7/2007 Tenhunen et al.
(Continued)

FOREIGN PATENT DOCUMENTS

CN 103476019 A 12/2013
EP 2 503 827 A1 9/2012
(Continued)

OTHER PUBLICATIONS

3GPP TS31.102 V5.14.0 (Oct. 2005), 3GPP; Technical Specification Group Core Network and Terminals; Characteristics of the Universal Subscriber Identity Module (USIM) application (Release 5), Oct. 2005.*
(Continued)

*Primary Examiner* — Faruk Hamza
*Assistant Examiner* — Cassandra L Decker
(74) *Attorney, Agent, or Firm* — Finnegan, Henderson, Farabow, Garrett & Dunner, L.L.P.

(57) ABSTRACT

There is provided a communication device (4) for providing access to a service via an access point (11) in a cellular communication system (1). The communication device (4) includes an application (15) for accessing the service via said point (11). The communication device (4) receives from the application (15) a service identifier for the service and obtains an identifier of an access point (11) via which said service can be accessed by mapping the service identifier to the identifier of an access point (11).

9 Claims, 5 Drawing Sheets

(51) Int. Cl.
H04W 8/26 (2009.01)
H04W 48/16 (2009.01)
H04W 12/08 (2009.01)
H04W 48/20 (2009.01)
H04W 8/20 (2009.01)
H04L 29/08 (2006.01)
H04W 48/00 (2009.01)
H04W 88/08 (2009.01)
H04L 29/12 (2006.01)

(52) U.S. Cl.
CPC ............ H04W 8/26 (2013.01); H04W 12/08 (2013.01); H04W 48/16 (2013.01); H04W 48/17 (2013.01); H04W 48/20 (2013.01); H04L 61/3075 (2013.01); H04L 61/35 (2013.01); H04L 61/6004 (2013.01); H04W 88/08 (2013.01)

(56) References Cited

U.S. PATENT DOCUMENTS

| | | | | |
|---|---|---|---|---|
| 2008/0285492 A1* | 11/2008 | Vesterinen | ............ | H04W 76/12 370/310 |
| 2012/0036282 A1* | 2/2012 | Chen | ................ | H04L 63/0428 710/9 |
| 2012/0113865 A1* | 5/2012 | Zhao | ................ | H04W 48/20 370/254 |
| 2012/0208597 A1* | 8/2012 | Billman | ................ | H04W 8/205 455/558 |
| 2012/0281581 A1 | 11/2012 | Liu | | |
| 2013/0016657 A1 | 1/2013 | Muhanna et al. | | |
| 2013/0070633 A1* | 3/2013 | Wakui | ................ | H04L 12/1435 370/252 |
| 2013/0294392 A1 | 11/2013 | Yu | | |
| 2014/0112301 A1 | 4/2014 | Shu et al. | | |
| 2014/0189790 A1* | 7/2014 | Mindler | ................ | H04L 67/02 726/3 |

FOREIGN PATENT DOCUMENTS

WO WO 2013/007220 A1 1/2013
WO WO 2014/024004 A1 2/2014

OTHER PUBLICATIONS

3GPP TR 22.802 V0.2.1, "Study of Need for Multiple APNs", 3$^{rd}$ Generation Partnership Project; Technical Specification Group SA; (Release 13),Feb. 2014.
Alcatel-Lucent, "Discussion: What is the benefit of the FS_MAPN work study item?", 3GPP TSG SA WG1 Meeting #63, S1-135042, Nov. 2013.
International Search Report and Written Opinion dated Jul. 7, 2015, in corresponding PCT International Application.
Search Report issued in the Priority GB Application dated Jun. 26, 2014.
Notification of Reasons for Refusal dated Sep. 19, 2017 from the Japanese Patent Office in counterpart Japanese Patent Application No. 2016-555621.
Motorola Mobility, AT&T, Qualcomm Incorporated, Intel, Brodcom Corporation, "Update ANDSF information to support WLAN access network selection", 3GPP SA WG2 Meeting #99 S2-133385, (2013), 8 pages.

* cited by examiner

COMMUNICATION SYSTEM

CROSS-REFERENCE TO RELATED PATENT APPLICATIONS This application is a National Stage Entry of International Application No. PCT/JP2015/056761, filed Mar. 2, 2015, which claims priority from GB 1403908.5, filed Mar. 5, 2014. The entire contents of the above-referenced applications are expressly incorporated herein by reference.

TECHNICAL FIELD

The present invention relates to a communication system and to associated apparatus and methods. The invention has particular although not exclusive relevance to communication systems in which machine type communication (MTC)/machine-to-machine (M2M) communication devices operate.

BACKGROUND ART

Machine Type Communications (MTC) (also referred to as Machine-to-machine (M2M) communications) refers to generally to communication that does not involve, or has very limited, human intervention.

Whilst MTC/M2M applications have been known since the earliest days of modern computing and communication, and pre-date more modern mobile (cellular) communications, MTC/M2M communications are now increasingly responsible for the growing data traffic in mobile communications networks with MTC/M2M devices expected to outnumber voice subscribers by two orders of magnitude or higher.

In order to better manage this data traffic, Mobile Network Operators (MNO) generally use multiple dedicated Access Points in their networks to route incoming M2M Applications data to corresponding M2M Applications servers. For the exchange of packet (e.g. internet protocol based) data to take place in most M2M applications, the items of user equipment ("UEs"—for example, embedded M2M modules, or mobile devices including such modules) on which the applications are implemented therefore need to know the correct Access Point Name (APN) to connect to.

Currently, in order to facilitate this, many MNOs are also M2M Service Providers who provide "end-to-end" solutions with applications and memory of the UEs being preconfigured with APNs and any other appropriate details of the access points of the MNO who provided/deployed the services.

SUMMARY OF INVENTION

Technical Problem

Whilst the above-mentioned solution or the like allows a UE to move within the network of a particular MNO with relative ease, it means that changing MNO can be expensive for the subscriber because the subscriber may have to change everything from the M2M applications to the M2M devices themselves (for example a deployed device with an embedded—e.g. an encapsulated and possibly soldered—UICC).

The need to maintain an accurate and up-to-date list of APNs represents a particular issue when the access points and/or their associated details (e.g. APN) change. This may occur for a number of reasons, for example:

1) Within the same network as a result of the MNO of the subscriber updating the names and/or other details of its access points at a particular time point (e.g. to facilitate a change in network configuration, the addition and/or removal of one or more access points, and/or the like).

2) Movement from a "home" network operated by a "home" MNO to a so-called "roaming" network operated by a different MNO, where there is an agreement at the subscription level between the home MNO and roaming MNO but where there are differences in the access point naming conventions. This may result, for example, in an APN in the roaming network being different from the corresponding APN in the home network. For example if MNO1 and MNO2 have a global roaming agreement, the MNO1 APN for a particular automotive service may be APN_MNO1_SMARTCAR and for MNO2 may be APN_MNO2_AUTOMOTIVE.

3) Movement to a new independent network e.g. as a result of a change in subscription. In this case, the original MNO and the new MNO have no commercial or technical link and so their respective access point naming conventions will, most likely, be very different.

Moreover, these issues are further compounded because, for M2M services, whilst the UE often includes a very generic telematics module or the like the M2M application running on the UE is generally very specific, requiring the use of a specific dedicated APN. As a result, the preloading of a comprehensive list including the correct APNs for all the specific M2M services represents a significant challenge to the mobile equipment vendor, who may have no service awareness.

Whilst a list of APNs for several different MNOs may be stored in the memory of the UE, this is not a practical solution because it places a significant management burden on the supplier of the UE to keep the APN list accurate and up-to-date, and because it results in significant UE resources being required for storage and internal device management to maintain the list. For example, a UE would need to maintain a list of well over 1000 different APNs if it is to be truly "globally compatible". Even if the UE is only required to be "regionally compatible" (e.g. covering a local geographic region, such as Europe) several hundred different APNs, at least, would need to be preconfigured and maintained.

Whilst these issues can be alleviated, to a certain extent, by agreements between an alliance of several MNOs on access point naming conventions (i.e. to use unique/commonly agreed APNs when roaming within networks of the alliance members), such an agreement is unlikely to encompass all MNOs. Further, such a solution is cumbersome and inflexible as it does not allow individual MNOs the flexibility to rapidly change access point deployments to take account of new emerging technologies.

The present invention seeks to provide an improved communication system and associated apparatus and methods for meeting or at least partially contributing to the above need.

Solution to Problem

In one aspect of the invention there is provided a communication device for providing access to a service via an access point in a cellular communication system, the communication device including: an application for accessing said service via said access point; means for receiving, from the application, a service identifier for said service; means for obtaining an identifier of an access point via which said service can be accessed by said application by mapping said service identifier to said identifier of an access point; means for associating, with said application, said identifier of an access point via which said service can be accessed by said application obtained by said obtaining means; and means for directing communication traffic from said application to the access point identified by said identifier of an access point associated with said application by said associating means.

The obtaining means may be operable to obtain a plurality of identifiers of respective access points, each identifier of an access point having associated therewith a respective service identifier for identifying a service that is accessible via the access point identified by that identifier. The obtaining means may be operable to obtain the or each identifier of an access point, and the respective service identifier associated with that identifier of an access point, from a subscriber identity module (SIM) card.

The SIM card may be a Universal Integrated Circuit Card (UICC) (e.g. an embedded UICC (e)UICC). The communication device may include said SIM card (e.g. soldered into said communication device).

The obtaining means may be operable to obtain the or each identifier of an access point, and the respective service identifier associated with that identifier of an access point, from an elementary file (EF). In this case, the EF may be a linear fixed-length type EF.

The obtaining means may further be operable to obtain for the or each obtained identifier of an access point, information identifying a priority associated with data traffic communicated via the access point represented by that obtained identifier.

The obtaining means may be further operable to obtain for the or each obtained identifier of an access point, information identifying a restriction associated with use of the access point represented by that obtained identifier. In this case, the information identifying a restriction may indicate that said use of the access point represented by the obtained identifier is restricted to certain applications. The information identifying a restriction may include a flag (e.g. a one byte flag). The information identifying a restriction may include a key (e.g. an eight byte key) that must be provided by an application in order to be able to use the access point represented by that obtained identifier.

The receiving means may be operable to receive said service identifier in a message requesting said identifier of an access point (e.g. in a GetAPN command).

The communication device may further include means for providing to said application, responsive to receipt of said service identifier, said identifier of an access point via which said service can be accessed by said application.

The associating means may be operable to perform said associating, with said application, of said identifier of an access point via which said service can be accessed by said application, responsive to receipt by said receiving means of a message requesting said associating (e.g. a BindAPN command). In this case, the message requesting said association may include an identifier of said application (e.g. and App ID) and said identifier of an access point via which said service can be accessed by said application to said application.

The service identifier may include a first part for identifying a primary service area and a second part for identifying a secondary service area within said primary service area. The at least one of said first part and said second part of said service identifier may be represented by a corresponding single byte. In this case, each of said first part and said second part of said service identifier may be represented by a respective single byte.

The or each identifier of an access point may be an access point name (APN).

The communication device may be a machine type communication (MTC) or machine-to-machine (M2M) device, said application may be an MTC or M2M application, and said service may be an MTC or M2M service.

In one aspect of the invention there is provided a subscriber identity module (SIM) card for use in providing access to a service via an access point in a cellular communication system, the SIM card including: means for storing information including a plurality of identifiers of respective access points, each identifier of an access point being stored in association with a respective service identifier for identifying a service that is accessible via the access point identified by that identifier; means for receiving a request to read said information from a communication device; and means for providing said information responsive to said request.

The information may be stored in an elementary file (EF). Each of said plurality of identifiers may be stored, in association with the respective service identifier, in a respective record of said EF. Each of said plurality of identifiers may be stored, in further association with information identifying a priority associated with data traffic communicated via the access point represented by that obtained identifier.

The plurality of identifiers may be stored, in further association with information identifying a restriction associated with use of the access point represented by that obtained identifier. The information identifying a restriction may indicate that said use of the access point represented by the obtained identifier is restricted to certain applications. The information identifying a restriction may include a flag (e.g. a one byte flag). The information identifying a restriction may include a key (e.g. an eight byte key) that must be provided by an application in order to be able to use the access point represented by that obtained identifier.

The SIM card may be a Universal Integrated Circuit Card (UICC) (e.g. an embedded UICC (e)UICC).

In one aspect of the invention there is provided a network node for providing updated information for providing access to a service via an access point in a cellular communication system, the network node including: means for maintaining information including a plurality of identifiers of respective access points, each identifier of an access point being stored in association with a respective service identifier for identifying a service that is accessible via the access point identified by that identifier; and means for providing said information maintained by said maintaining means to a communication device, as part of an update procedure, in order to update a subscriber identity module (SIM) card in said communication device with said information.

In one aspect of the invention there is provided a communication device for providing access to a service via an access point in a cellular communication system, the communication device including: an application for accessing said service via said access point; a transceiver configured to: i) receive, from the application, a service identifier for said service; and ii) obtain an identifier of an access point via which said service can be accessed by said application by mapping said service identifier to said identifier of an access point; and a processor configured to: i) associate, with said application, said identifier of an access point via which said service can be accessed by said application obtained by said transceiver; and ii) direct communication traffic from said application to the access point identified by said identifier of an access point associated with said application.

In one aspect of the invention there is provided a subscriber identity module (SIM) card for use in providing access to a service via an access point in a cellular communication system, the subscriber identity module including: a memory arranged to store information including a plurality of identifiers of respective access points, each identifier of an access point being stored in association with a respective service identifier for identifying a service that is accessible via the access point identified by that identifier; and a transceiver configured to receive a request to read said information from a communication device; and provide said information responsive to said request.

In one aspect of the invention there is provided a network node for providing updated information for providing access to a service via an access point in a cellular communication system, the network node including: a processor configured to maintain information including a plurality of identifiers of respective access points, each identifier of an access point being stored in association with a respective service identifier for identifying a service that is accessible via the access point identified by that identifier; and a transceiver configured to provide said information maintained by said processor to a communication device, as part of an update procedure, in order to update a subscriber identity module (SIM) card in said communication device with said information.

In one aspect of the invention there is provided a system including the above described communication device, the above described subscriber identity module (SIM) card, and the above described network node.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

DESCRIPTION OF EMBODIMENTS

Embodiments of the invention will now be described by way of example only with reference to the attached figures.
<Overview>

Figure 1:
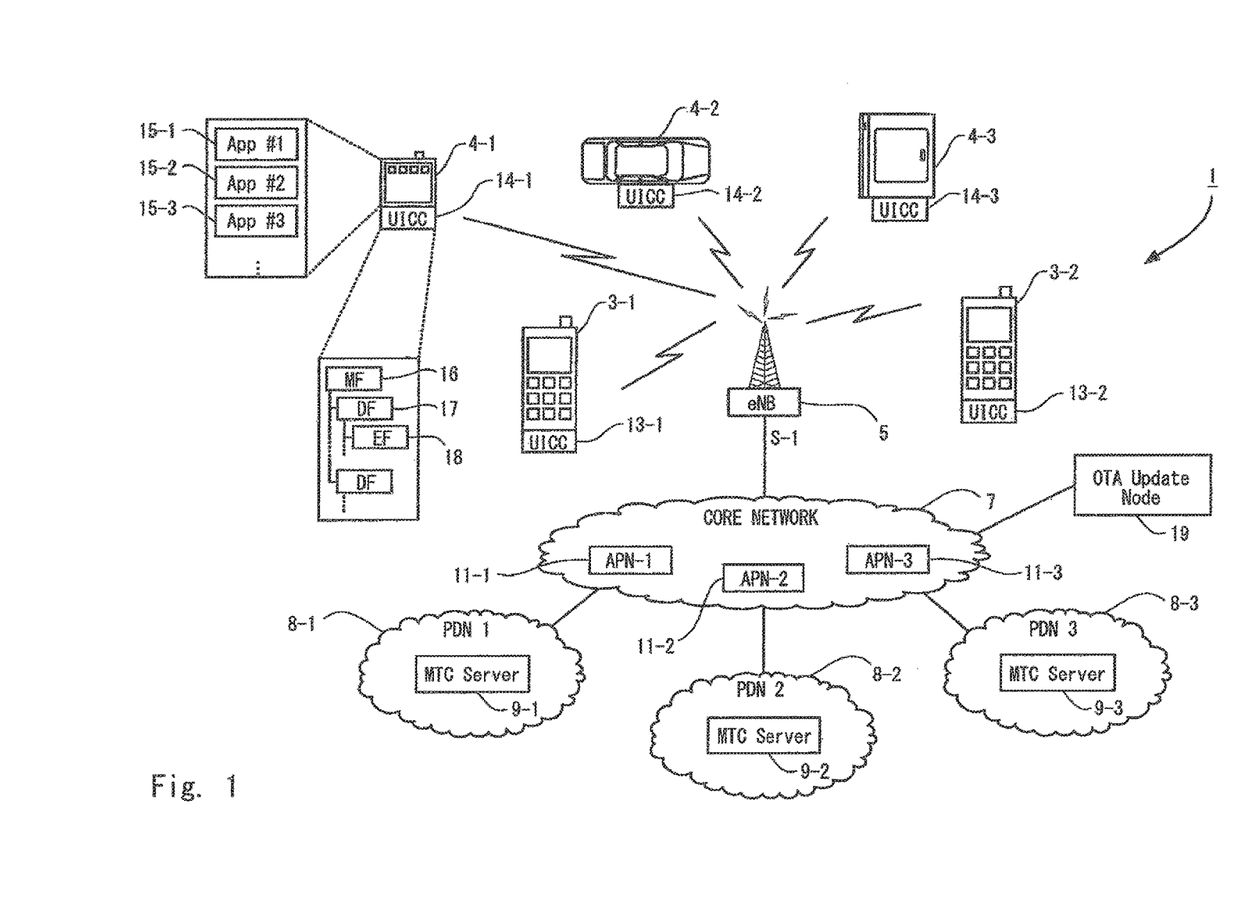
FIG. 1 schematically illustrates a communication system including machine type communication devices.

FIG. 1 shows, in overview, a communication system generally at 1. The communication system 1 includes a number of items of user equipment (UEs) 3-1, 3-2 and 4-1 to 4-3, a base station 5, a core network 7, a plurality of packet data networks (PDNs) 8-1 to 8-3 each including at least one machine type communication (MTC) server 9-1 to 9-3 (also referred to as a machine-to-machine (M2M) server), and a plurality of access points 11-1 to 11-3.

The UEs 3, 4 include a number of conventional mobile communication devices 3 (mobile telephones in this example) configured to communicate with one another and/or other communication devices (not shown) via the base station 5 and the core network 9. The UEs 3, 4 also include a number of machine type communication (MTC) (or "machine-to-machine (M2M)") devices 4 each of which is configured to communicate with one or more of the MTC servers 9 via the base station 5, the core network 7 and a corresponding access point 11.

It will be appreciated that whilst three separate PDNs 8 are shown, each having one respective MTC server 9 accessible via a single access point 11, a single PDN (or any other number of PDNs) may include a plurality of MTC servers and may be accessible via a plurality of access points.

Each MTC device 4 includes one or more MTC applications 15-1 to 15-3 configured to access at least one associated MTC service (e.g. a Smart Vehicle service, a Vending Machine service, a Healthcare service, and/or the like) provided by a corresponding MTC server 9 via an appropriate access point 11. Each MTC service accessed by the MTC applications may include any of a plurality of related subservices. For example, a Smart Vehicle service may include: one or more diagnostic subservices for identifying maintenance and/or other vehicle related issues; one or more customer care subservices; one or more navigation subservices; and/or the like. Similarly, a Vending Machine service may include: one or more stock control subservices for monitoring stock levels etc.; one or more diagnostic subservices for identifying maintenance and/or other issues associated with the vending machine; and/or the like.

Each UE 3, 4 include an associated universal integrated circuit card (UICC) 13-1, 13-2, 14-1 to 14-3 including a (universal) subscriber identity module ((U)SIM) which holds subscriber identification information (e.g. the international mobile subscriber identity (IMSI)) and a related key for identifying and authenticating a subscriber with whom the UE is associated. The UICCs 13-1, 13-2 of the conventional mobile communication devices 3-1, 3-2 respectively is located in a removably replaceable plastic SIM card whilst, in this example, the respective UICC 14-1, 14-2, 14-3 of each MTC device 4-1, 4-2 4-3 respectively are integrated into a surface mount package soldered directly onto a circuit board within that MTC device 4.

The respective MTC UICC 14 of each MTC device 4, in this example, is an embedded UICC ("eUICC") which, unlike the UICCs of conventional mobile communication devices such as mobile telephones, is not linked to a specific MNO. Instead, the content of each eUICC 14 is updatable by any MNO therefore allowing a subscription change to be made more easily and hence with less cost. It will be appreciated, however, a UICC that is linked a specific MNO could be used whilst still retaining many of the benefits of described herein.

In more detail, each MTC eUICC 14 is installed in the respective MTC device, at the manufacturing stage, without an active USIM. It is only later, once an MNO is selected that a USIM with the appropriate MNO authentication credentials and profile is activated in the eUICC 14. Data connectivity is then enabled using the mobile service provider represented by the selected MNO.

Each UICC 13, 14 includes a hierarchical file structure including configuration and/or control data for the UICC 13, 14 and/or UE 3, 4 in which the data is stored. The hierarchical file structure includes a master file (MF) 16 (conceptually similar to a root directory) including a plurality of dedicated files (DFs) 17 (conceptually similar to sub-directories) each of which holds a one or more so-called Elementary Files (EFs) 18 and possibly one or more further DFs. Each EF 18 includes a set of bytes representing specific control/configuration data for the UICC 13, 14 and/or UE 3, 4 in which the data is stored.

The file structure of each UICC 14 of a respective MTC device 4 includes information identifying all the access points 11 that the MTC device 4 can use to access the PDNs 8 in which the MTC servers 9 are located. Beneficially, the information identifying each access point 11 (e.g. an Access Point Name (APN) and/or other identification information) is stored, in a standardised format, in association with information identifying each respective service and/or sub-service (e.g. a service/subservice identifier that may be globally or locally "unique") that the identified access point 11 is able to provide access to. In this example, the information identifying each access point 11 is advantageously stored in at least one EF 18 in association with the respective service/subservice identifier(s) for the service(s)/subservice(s) that that access point may be used to provide access to.

An application interface is beneficially provided to allow each MTC application 15 to efficiently and reliably interrogate the UICC 14, via the MTC device 4, to discover the information identifying the access point, based on the standardised identity of the service/subservice (e.g. the service/subservice identifier) that the MTC application 15 requires access to. The MTC application 15 is therefore able to identify the access point easily and hence access the service/subservice efficiently and reliably.

The communication system also includes at least one over-the-air (OTA) update node 19 for providing OTA updates to the UEs 3, 4 (or more specifically their UICCs 13, 14).

A mobile network operator and/or MTC service provider is able to configure, for each service/subservice, the UICC with the respective APN via which that service/subservice can be accessed (along with any other associated access point details as appropriate). This access point configuration can then be updated via the OTA update node(s) 19 (e.g. using an over-the-air, "OTA", platform), with relative ease, if the APN and/or other details change whether as a result of: changes within the network of the current network operator (e.g. changes to the APNs as a result of changes in network configuration, addition/removal of APNs, or the like); roaming between the networks of network operators that have an agreement at the subscription level but that use different access point naming conventions; or a change of networks between operators that are completely independent of one another (e.g. as a result of a user subscribing to a new network operator).

<MTC Device>

Figure 2:
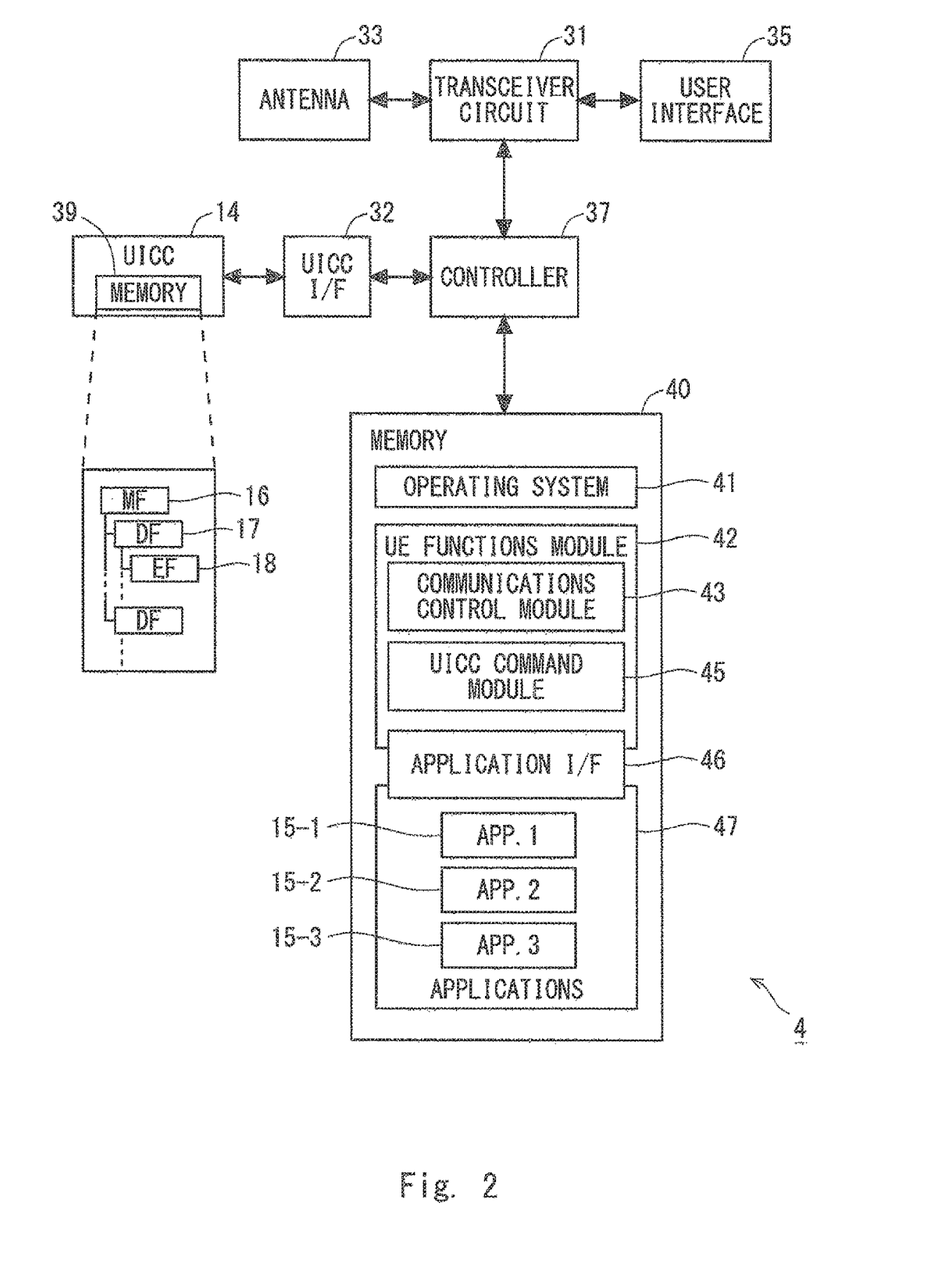
FIG. 2 schematically illustrates a machine type communication device for the communication system of FIG. 1.

FIG. 2 is a block diagram illustrating the main components of the MTC device 4 shown in FIG. 1. As shown in FIG. 2, the MTC device 4 has a transceiver circuit 31 that is operable to transmit signals to and to receive signals from a base station 5 and/or a mobile telephone 3 via one or more antenna 33. The MTC device 4 has a controller 37 to control the operation of the MTC device 4 and a subscriber identity module which, in this embodiment, includes an embedded Universal Integrated Circuit Card ((e)UICC) 14.

The UICC 14 is coupled to the MTC device 4 via an appropriate UICC interface 32 and the controller 37. The controller 37 is associated with a memory 40 and is coupled to the transceiver circuit 31. The MTC device 4 may of course have all the usual functionality of a conventional MTC device 4 or a conventional mobile communication device 3 (such as a user interface 35 including touch screen/keypad, visual display, audio output etc . . . ) and this may be provided by any one or any combination of hardware, software and firmware, as appropriate. Software may be pre-installed in the memory 40 and/or may be downloaded via the telecommunications network or from a removable data storage device (RMD), for example.

The controller 37 is configured to control overall operation of the MTC device 4 including interaction with the UICC 14 by, in this example, program instructions or software instructions stored within memory 40. As shown in FIG. 2, these software instructions include, among other things, an operating system 41, a UE functions module 42, a communications control module 43, a UICC command module 45, an applications interface 46, and an applications area 47.

The communications control module 43 controls the communication between the MTC device 4 and the base station 5 serving the MTC device 4.

The UICC 14 has its own processing capability (not shown) and includes a local memory 39 that holds, amongst others, a master file (MF) 16, a plurality of dedicated files (DFs) 17, and one or more associated elementary files (EFs) 18.

The UICC command module 45 manages the interaction with the UICC 14 and access to the information stored in the local memory 39 of the UICC 14 via interfaces defined by 3GPP, ETSI, and/or ISO (International Organization for Standardization). The UICC command module 45 facilitates communication between the UICC 14 and the applications 15 (via the UICC interface 32 and the application interface 46).

The applications area 47 holds a number of applications 15-1 to 15-3 installed on (and/or remotely accessible by) the MTC device 4 and controls their access to the other modules of the MTC device 4, including the UICC 14 via the application interface 46.

The application interface 46 resides between the application area 47 and middleware on the UE 3 (in the UE functions module 42). The application interface 46 allows, for example, a particular application 15 to retrieve an APN corresponding to a particular service/sub-service identifier and to bind itself to using the retrieved APN so that its data traffic will be routed via the access point represented by that APN.

In this example, the application interface 46 includes a function that an application 15 can use for retrieving APNs based on the identity of the application ("AppID") and the identity of the service/sub-service that it requires access to (e.g. using a GetAPN (AppId, Service/Sub-service Id) command or the like.

The application interface 46 also includes a function to bind a specific application to a specific APN, once the APN has been retrieved, based on the identity of the application ("AppID") and the retrieved APN ("APNx") (e.g. using a BindAPN (AppId, APNx)).

<UICC>

Figure 3:
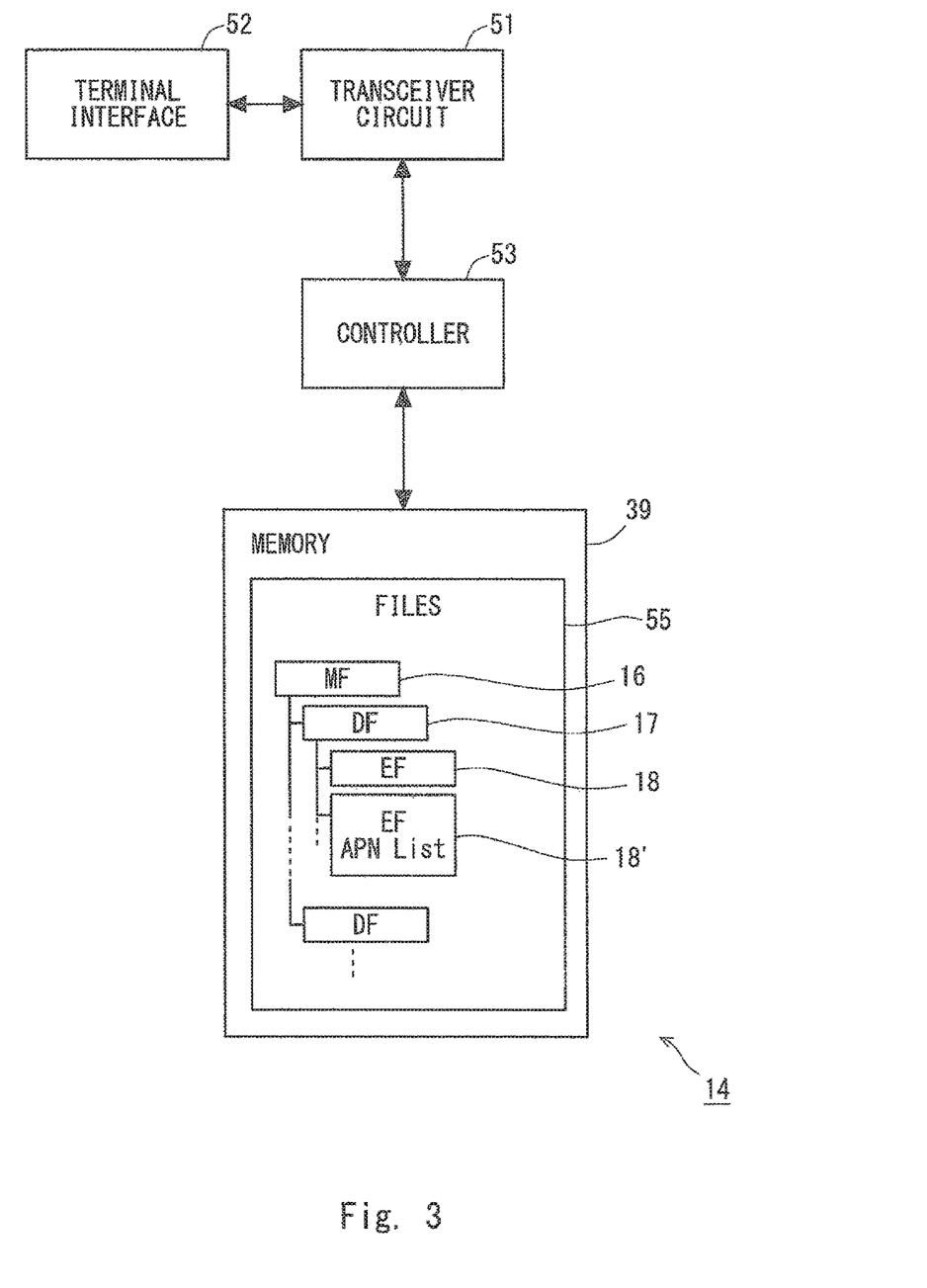
FIG. 3 schematically illustrates a UICC for the machine type communication device of FIG. 2.

FIG. 3 is a block diagram illustrating the main components of the universal integrated circuit card 14 used with the MTC device 4 shown in FIG. 1. As shown in FIG. 3, the UICC 14 has a transceiver circuit 51 that is operable to transmit signals to and to receive signals from the MTC device 4 via a terminal interface 52. The UICC 14 has a controller 53 to control the operation of the UICC 14. The controller 53 is associated with a local memory 39 and is coupled to the transceiver circuit 51. Software may be pre-installed in the local memory 39 and/or may be downloaded via the telecommunications network or from a removable data storage device (RMD), for example.

The controller 53 is configured to control overall operation of the UICC 14, and interaction with the MTC device 4 (and hence the applications 15) by, in this example, program instructions or software instructions stored within the local memory 39. As shown in FIG. 3, the local memory also includes, among other things, a files area 55, in which a master file (MF) 16, a plurality of dedicated files (DFs) 17, and one or more associated elementary files (EFs) 18 are held. The elementary files 18 also include an elementary file 18' for storing the list of APNs (referred to herein as "EF APNList") in association with information identifying the services/sub-services that the APNs are used to access (service/subservice identifiers).

In the present example the service/subservice identifiers are coded onto two bytes with the first byte identifying a particular top-level "core" or "primary" service area and the second byte identifying a particular lower-level "subsidiary" or "secondary" service area (or "sub-service") within said primary service area. This therefore allows 256 "services" to be defined and, for each service, 256 "sub-services" to be defined.

The following illustrates a purely exemplary illustration of how the identifiers including the bytes may be used in a practical implementation.

Identifier: 0xB1B2 with first byte (B1) set to:

---
00: Reserved
01: SmartVehicle service
02: VendingMachine service
03: Healthcare service
04: SmartTracking service
05: 6$^{th}$ possible service
. . .
0n: (n + 1)$^{th}$ possible service
. . .
255: 256$^{th}$ possible service
---

Identifier: 0x01B2 with first byte (B1) set to "01" (representing a SmartVehicle service) and the second byte (B2) set to:

---
00 = Default
01 = SmartVehicle.Diagnostic sub-service
02 = SmartVehicle.CustomerCare sub-service
03 = 4$^{th}$ possible SmartVehicle.sub-service
. . .
0m: (m + 1)$^{th}$ possible SmartVehicle.sub-service
. . .
255: 256$^{th}$ possible SmartVehicle.sub-service
---

Identifier: 0x02B2 with first byte (B1) set to "02" (representing a VendingMachine service) and the second byte (B2) set to:

---
00 = Default
01 = VendingMachine.stock sub-service
02 = VendingMachine.Diagnostic sub-service
03 = 4$^{th}$ possible VendingMachine.sub-service
. . .
0p: (p + 1)$^{th}$ possible VendingMachine.sub-service
. . .
255: 256$^{th}$ possible VendingMachine.sub-service
---

The two bytes used for coding the service/subservice identifiers are used in the EF 18' including the list of APNs to map each service/sub-service to the APN that can be used to access that service.

In this example, EF APNList 18' is a linear fixed type EF having a header followed by a sequence of records of fixed length with each record including the following information:
Service ID/Sub service ID (e.g. as defined above)
Length of the APN
The APN: Access Point Name (e.g. as defined in 3GPP TS 23.003)
Priority order: High, Medium, Low, null (assigned by the MNO for data traffic through this APN) (Optional).
This is illustrated in Table 1 below.

TABLE 1

EF APN List Record Example

| Service/Sub-service Identifier (2 bytes) | Length of APN (1 byte) | APN (X bytes) | Priority Order (1 byte) |
|---|---|---|---|

Each service/sub-service identifier is unique within the new EF APNList 18' with a single respective APN being associated with (mapped to) each service/sub-service identifier. The same APN may, nevertheless, be associated with (mapped to) one or more different service/sub-service identifiers so that the same access point may be used to access a plurality different services/sub-services.

It will be appreciated that a single application 15 (e.g. multi instances/threads application) may also be associated with a plurality of service/sub-service identifiers (and therefore can use several different access points (with associated APNs)). However, each instance of such an application 15 will, typically, only communicate via a single access point (e.g. using a single APN) at a time.

In the above description, the MTC device 4 and the UICC 14 are described for ease of understanding as having a number of discrete modules (such as the communications control module and the UICC command module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<OTA Update Node>

Figure 4:
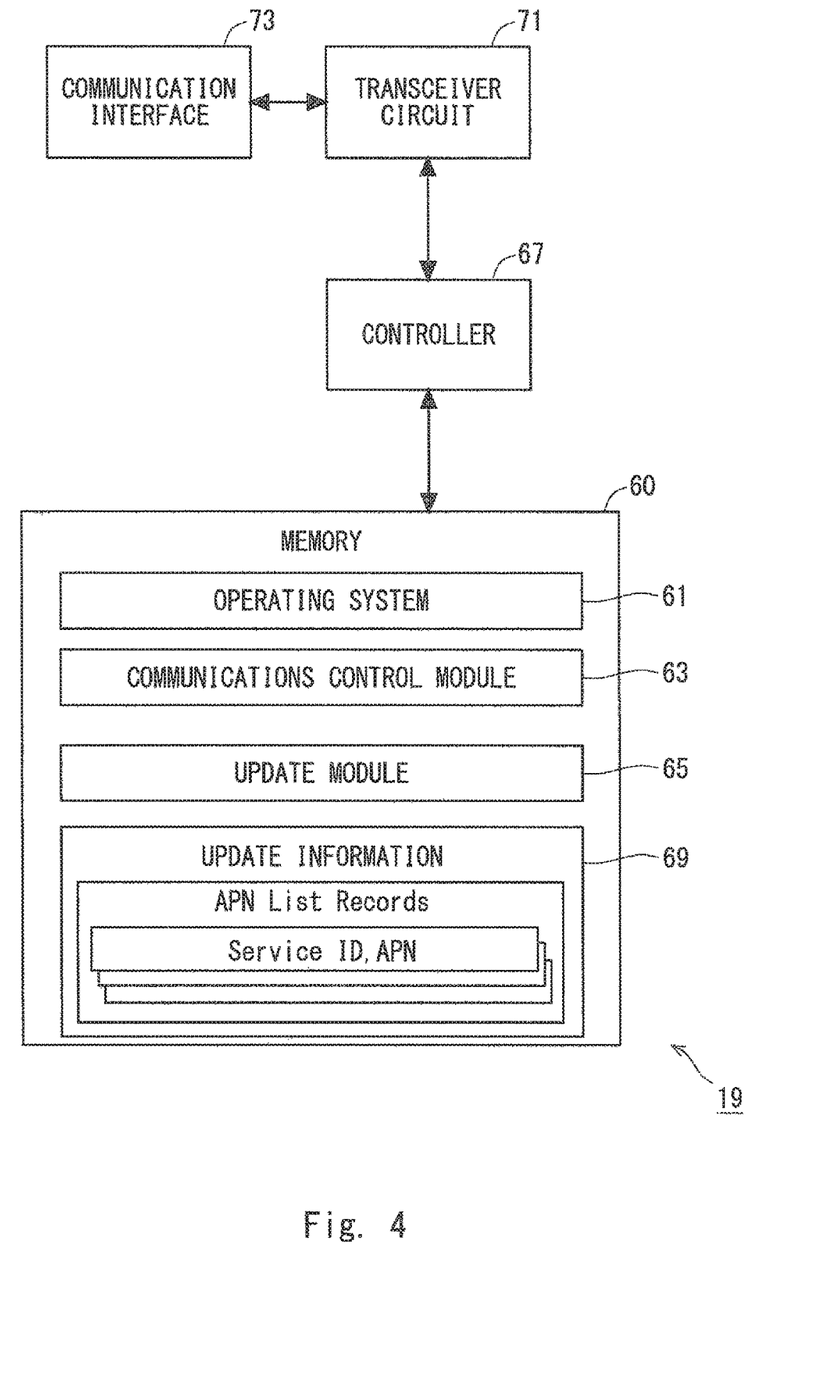
FIG. 4 schematically illustrates a network node for the communication system of FIG. 1.

FIG. 4 is a block diagram illustrating the main components of the OTA update node 19 shown in FIG. 1. As shown in FIG. 4, the OTA update node 19 has a transceiver circuit 71 that is operable to transmit signals and to receive signals via the core network 7 for updating the UICCs 14 of the MTC devices 4 (and UICCs 13 o other UEs 3) via a communication interface 73. The OTA update node 19 has a controller 67 to control the operation of the OTA update node 19. The controller 67 is associated with a local memory 60 and is coupled to the transceiver circuit 71. Software may be pre-installed in the local memory 60 and/or may be downloaded via the telecommunications network or from a removable data storage device (RMD), for example.

The controller 67 is configured to control overall operation of the OTA update node 19, and communication via the core network 7 (and hence with the MTC devices 4 and other UEs 3) by, in this example, program instructions or software instructions stored within the local memory 60. As shown in FIG. 4, the local memory also includes, among other things, an operating system 61, a communications control module 63, an update module 65, and update information 69.

The communications control module 63 controls the communication, via the core network 7 (e.g. via an OTA gateway or the like), with the MTC devices 4 and other UEs 3 for updating the UICCs 13, 14 of the MTC devices 4 and other UEs 3. The update module 65 controls the updating procedure and the update information 69 includes information that may, from time-to-time, be required for updating the information stored on the UICCs 13, 14. In the example shown the update information 69 includes, inter alia, information for updating the EF APNList 18' stored on the MTC device UICCs 14 such as APN List records including the APNs stored in association with information identifying the service/sub-service (e.g. the two byte service/sub-service identifier—referred to more simply as a "Service ID").

<Operation>

Figure 5:
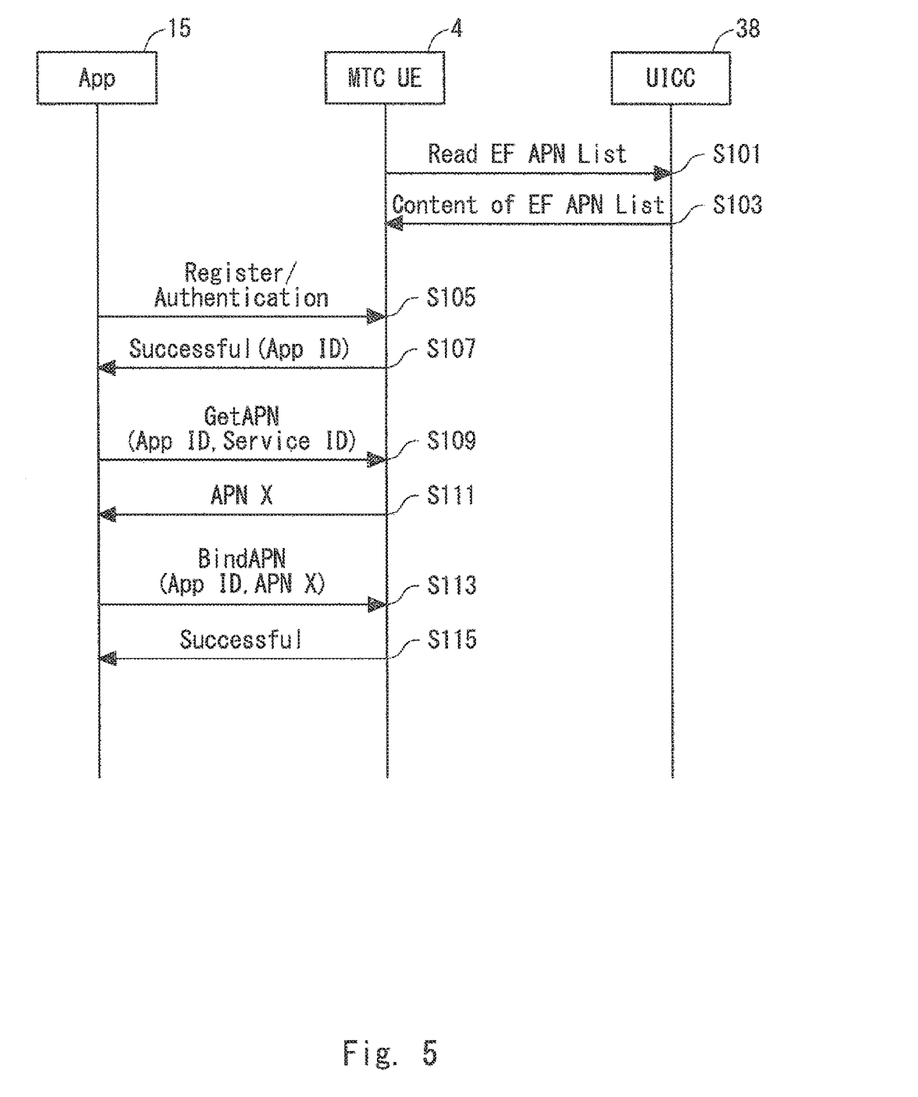
FIG. 5 illustrates a method employed by an application in the machine type communication device of FIG. 2.

FIG. 5 is a simplified timing diagram showing a method employed by an application 15 in the machine type communication device 4 to retrieve and bind a particular APN for accessing a particular service/sub-service.

Initially, before the application 15 is registered and authenticated on the MTC device 4 the MTC device 4 reads the contents of the EF 18' in which the APN list is stored from the UICC 14. This is achieved by MTC device 4 the sending an appropriate read record command to the UICC 14 at S103 (e.g. a "Read EF APN List" command) and receiving an associated response at S103, sent from the UICC 14, including the content of the EF 18' in which the APN list is stored.

The application 15 then registers and authenticates with the MTC device 4 at S105 and receives a confirmation, from the MTC device 4 that registration/authentication is successful at S107. The MTC device 4 includes, in the confirmation, an application identifier ("App ID") allocated to the application 15 (the App ID is typically unique to the MTC device 4 in which the application operates). At S109 the application 15 requests, from the MTC device 4, the APN for a service that it requires by sending a request/command (e.g. "GetAPN") which includes the application identifier allocated to the application 15 and information identifying a service that the application wishes to access (e.g. the two byte standardised service/sub-service identifier). Using this information identifying a service, the MTC device 4 retrieves the APN from the contents of the EF 18' that was previously retrieved from the UICC 14 (and possibly any other relevant information such as the priority order). The MTC device 4 then sends, at S111 the retrieved APN (and possibly other retrieved information) to the application 15 as a response to the request/command for the APN received from the application 15 at S109. The application 15 proceeds to initiating the binding the APN to the application by sending, at S113, a request/command, to the MTC device 4, to bind the APN to that application 15 (e.g. "BindAPN"). The request/command to bind the APN to the application 15 includes the application identifier allocated to the application 15 and information identifying the APN that the application retrieved at S111. The MTC device 4 proceeds to complete and, once completed, confirms to the application that the binding was successful at S115. The MTC device 4 thus knows which APN to use to route the application data connection traffic.

(Update Procedure)

Updating of the APN list represented by the EF APNList 18' is achieved by a modified version of the over-the-air update procedure defined in the relevant standards (e.g. as defined by and/or European Technical Standards Institute (ETSI) technical standards (TS) ETSI TS 102 225, ETSI TS 102 226, and/or 3rd Generation Partnership Project (3GPP) technical standards 3GPP TS 31.115, 3GPP TS 31.116). The core update procedure will not, therefore, be described in further detail here.

Unlike the existing procedure, however, when updating the APN information the OTA update node 19 responsible for providing the updated APN information provides the information, using the identifier of the EF 18' including the APN list, in a format corresponding to the EF 18' including records (as illustrated in Table 1 above) having a two byte service/subservice identifier stored in association with an APN (and other associated information).

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In another embodiment the records of the EF the including the list of APNs in association with the service/sub-service identifiers may include information for restricting access to an APN, or group of APNs, to one or more specific applications only. This may, for example, be included as a one byte "flag" (e.g. a "RestrictionFlag") or the like indicating which application, application group, or application type is allowed to access (or possibly is not allowed to access) the identified service/sub-service via the identified access point. Such a flag will beneficially allow a distinction between applications developed or certified by the network operator and other 3rd party applications that are not allowed to use a particular APN/service or are only allowed to use them in certain circumstances (e.g. if traffic from certified applications is low). Thus, access to some particular APNs can be provided selectively to some specific applications (e.g. for Premium services).

A possible (more secure) implementation than using a simple 1 byte flag is to use a longer security key (e.g. a 8 or 16 or more bytes string) instead of the 1 byte flag as illustrated below.

| Service/Sub-service Identifier (2 bytes) | Length of APN (1 byte) | APN (X bytes) | Priority Order (1 byte) | Restriction key (8 bytes) |
| --- | --- | --- | --- | --- |

In this case, the key will be associated with each APN that the operator wants to restrict access to. Applications of the operator, or certified by the operator, are programmed with this key and pass this key when calling the binding function. In this case the binding function (e.g. BindAPN( )) previously referred to might include a "key" parameter as follows:

BindAPN (AppID, APNx, key)

The terminal may them compare this APNx/key pair with the one(s) read from the UICC (e.g. first retrieving the APN, and then comparing the keys). If the keys match, then the application with the passed AppId can access to the requested APNx.

It will be appreciated that although the MTC device is described, in the above example, as reading the contents of the APN list EF from the UICC prior to the registration/authentication of the application, the MTC device can retrieve the contents of the EF (in full or possibly in part) at any appropriate time. For example, an application may prompt a retrieval process when it attempts to obtain an APN or a retrieval process could be initiated by the network after the contents of the UICC have been updated.

The application may be held internally or externally to the MTC device including the APN list. For example, an application in another device connected to the MTC device (wirelessly or otherwise) may retrieve the APN information stored on the UICC of the MTC device to enable appropriate derivation of an APN for use by that application.

Although the above invention is described with particular reference to its implementation in and advantages for MTC devices, it will be appreciated that a similar data structure could be used in conventional mobile or other cellular communication devices, such as smart phones or the like, to allow applications (apps) to identify access points for accessing other networks, such as PDNs, data servers and/or other devices efficiently and effectively.

Whilst the use of a new elementary file (EF) in the UICC to store the APN list is beneficial, the APN list may be stored in association with service/sub-service identification information in the UICC elsewhere in the UICC file hierarchy or in some other manner. The APN list may be stored in an EF that is not a linear fixed-length file but is, instead, a linear variable-length file albeit at the expense of higher read/write access time and data storage overhead.

Whilst a UICC base solution in which the APN list is stored and updated in an EF of a UICC a similar, UE based, APN list storage structure could be employed in which the MTC device includes a database or the like in which the APNs are stored in association with the service/sub-service identity information in a standardised format.

In the above embodiments, a number of software modules were described. As those skilled in the art will appreciate, the software modules may be provided in compiled or un-compiled form and may be supplied to the UEs as a signal over a computer network, or on a recording medium. Further, the functionality performed by part or all of this software may be performed using one or more dedicated hardware circuits.

The software module (i.e., computer program) can be stored and provided to a computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

Various other modifications will be apparent to those skilled in the art and will not be described in further detail here.

This application is based upon and claims the benefit of priority from United Kingdom patent application No. 1403908.5, filed on Mar. 5, 2014, the disclosure of which is incorporated herein in its entirety by reference.

REFERENCE SIGNS LIST

1 COMMUNICATION SYSTEM
3 UE, MOBILE COMMUNICATION DEVICE
4 UE, MTC DEVICE
5 BASE STATION
7 CORE NETWORK
8 PDN
9 MTC SERVER
11 ACCESS POINT
13, 14 UICC
15 MTC APPLICATION
16 MF
17 DF
18 EF
18' EF APN LIST
19 OTA UPDATE NODE
31, 51, 71 TRANSCEIVER CIRCUIT
32 UICC INTERFACE
33 ANTENNA
35 USER INTERFACE
37, 53, 67 CONTROLLER
39, 40, 60 MEMORY
41, 61 OPERATING SYSTEM
42 UE FUNCTIONS MODULE
43, 63 COMMUNICATIONS CONTROL MODULE
45 UICC COMMAND MODULE
46 APPLICATION INTERFACE
47 APPLICATIONS AREA
52 TERMINAL INTERFACE
55 FILES AREA
65 UPDATE MODULE
69 UPDATE INFORMATION
73 COMMUNICATION INTERFACE

The invention claimed is:

1. A communication device for providing access to a service via an access point in a cellular communication system, the communication device comprising:
  an application for accessing said service via said access point;
  a transceiver configured to:
    receive, from the application, a service identifier for said service; and
    obtain an identifier of the access point via which said service can be accessed by said application based on information in which said service identifier and said identifier of the access point are mapped; and
  a processor configured to:
    bind, to an identifier of said application, said identifier of the access point via which said service can be accessed by said application obtained by said transceiver; and
    direct communication traffic from said application to the access point identified by said identifier of the access point bound to said identifier of said application, wherein:

the transceiver is further configured to obtain information identifying a restriction associated with use of the access point represented by the obtained identifier, and the information identifying a restriction comprises a key that is provided by the application for the use of the access point represented by the obtained identifier.

2. The communication device according to claim 1, wherein said transceiver is operable to obtain a plurality of identifiers of respective access points, each identifier of an access point having associated therewith a respective service identifier for identifying a service that is accessible via the access point identified by that identifier.

3. The communication device according to claim 2, wherein said transceiver is operable to obtain the each identifier of an access point, and the respective service identifier associated with that identifier of an access point, from a subscriber identity module (SIM) card.

4. The communication device according to claim 3, wherein said SIM card is a Universal Integrated Circuit Card (UICC).

5. The communication device according to claim 3, wherein said communication device comprises said SIM card.

6. The communication device according to claim 1, wherein the communication device comprises a machine type communication (MTC) or machine-to-machine (M2M) device, said application comprises an MTC or M2M application, and said service comprises an MTC or M2M service.

7. A system comprising:
  a communication device for providing access to a service via an access point in a cellular communication system, wherein the communication device comprises:
    an application for accessing said service via said access point,
    a transceiver configured to:
      receive, from the application, a service identifier for said service; and
      obtain an identifier of the access point via which said service can be accessed by said application based on information in which said service identifier and said identifier of the access point are mapped, and
    a processor configured to:
      bind, to an identifier of said application, said identifier of the access point via which said service can be accessed by said application obtained by said transceiver; and
      direct communication traffic from said application to the access point identified by said identifier of the access point bound to said identifier of said application, wherein:
    the transceiver is further configured to obtain information identifying a restriction associated with use of the access point represented by the obtained identifier, and
    the information identifying a restriction comprises a key that is provided by the application for the use of the access point represented by the obtained identifier;
  a subscriber identity module (SIM) card for use in providing access to the service via the access point in the cellular communication system, wherein the subscriber identity module comprises:
    a memory arranged to store information comprising a plurality of identifiers of respective access points, each of the plurality of identifiers of respective access points being stored in association with a respective service identifier for identifying the service that is accessible via an access point identified by the each identifier; and
    a transceiver configured to receive a request to read said information from the communication device; and provide said information responsive to said request; and
  a network node for providing updated information for providing access to the service via the access point in the cellular communication system, wherein the network node comprises:
    a processor configured to maintain information comprising a plurality of identifiers of respective access points, each of the plurality of identifiers of respective access points being stored in association with a respective service identifier for identifying the service that is accessible via an access point identified by the each identifier; and
    a transceiver configured to provide said information maintained by said processor to the communication device, as part of an update procedure, in order to update the SIM card in said communication device with said information.

8. A method performed by a communication device for providing access to a service via an access point in a cellular communication system, the communication device comprising an application for accessing said service via said access point and comprising a transceiver configured to receive, from the application, a service identifier for said service, the method comprising:
  obtaining an identifier of the access point via which said service can be accessed by said application based on information in which said service identifier and said identifier of the access point are mapped;
  binding, to an identifier of said application, said identifier of the access point via which said service can be accessed by said application obtained by said obtaining;
  directing communication traffic from said application to the access point identified by said identifier of the access point bound to said identifier of said application by said binding; and
  obtaining information identifying a restriction associated with use of the access point represented by the obtained identifier,
  wherein the information identifying a restriction comprises a key that is provided by the application for the use of the access point represented by the obtained identifier.

9. A non-transitory computer readable media that stores a computer program including computer implementable instructions that, when executed by a programmable communications device, causes the programmable communications device to perform a method, the method comprising:
  receiving, from the application, a service identifier for said service;
  obtaining an identifier of the access point via which said service can be accessed by said application based on information in which said service identifier and said identifier of the access point are mapped;
  binding, to an identifier of said application, said identifier of the access point via which said service can be accessed by said application obtained by said transceiver;
  directing communication traffic from said application to the access point identified by said identifier of the access point bound to said identifier of said application; and obtaining information identifying a restriction associated with use of the access point represented by the obtained identifier,
wherein the information identifying a restriction comprises a key that is provided by the application for the use of the access point represented by the obtained identifier.

* * * * *